United States Patent

[11] 3,564,350

| [72] | Inventors | Randall N. King |
| | | Johnstown; |
| | | William N. Carson, Jr., Schenectady, N.Y. |
| [21] | Appl. No. | 821,445 |
| [22] | Filed | May 2, 1969 |
| [45] | Patented | Feb. 16, 1971 |
| [73] | Assignee | General Electric Company |

[54] COULOMETER WITH ELECTRODE CONTAINING EXCESS OF AT LEAST 200 PERCENT MERCURIC OXIDE
2 Claims, 1 Drawing Fig.

[52] U.S. Cl. .................................................. 317/230,
317/231; 136/182
[51] Int. Cl. ............................................... H01g 9/00
[50] Field of Search ............................................ 317/230,
231, 233; 136/24, 182; 320/48

[56] References Cited
UNITED STATES PATENTS

| 2,644,902 | 7/1953 | Hardway | 317/231X |
| 2,934,580 | 4/1960 | Neumann | 136/24 |
| 3,143,691 | 8/1964 | Hurd | 317/231 |
| 3,302,091 | 1/1967 | Henderson | 320/48 |
| 3,463,673 | 8/1969 | Stroup | 320/48X |

Primary Examiner—James D. Kallam
Attorneys—Richard R. Brainard, Paul A. Frank, Charles T. Watts, Paul R. Webb, II, Frank L. Neuhauser, Oscar B. Waddell and Joseph B. Forman ABSTRACT: A coulometer has a closed container including an alkaline electrolyte and a pair of spaced apart, reversible electrodes in contact with the electrolyte. Each of the electrodes consists of an inert support, active material on the support, and an electrically conductive lead. One of the electrodes has active material of metallic mercury in an amount equivalent to the predetermined coulometric capacity of the coulometer, and active material of mercuric oxide in an amount of at least 200 percent of the metallic mercury. The other electrode has active material of mercuric oxide in an amount equivalent to the amount of the metallic mercury and mercuric oxide of the first electrode.

PATENTED FEB 16 1971
3,564,350
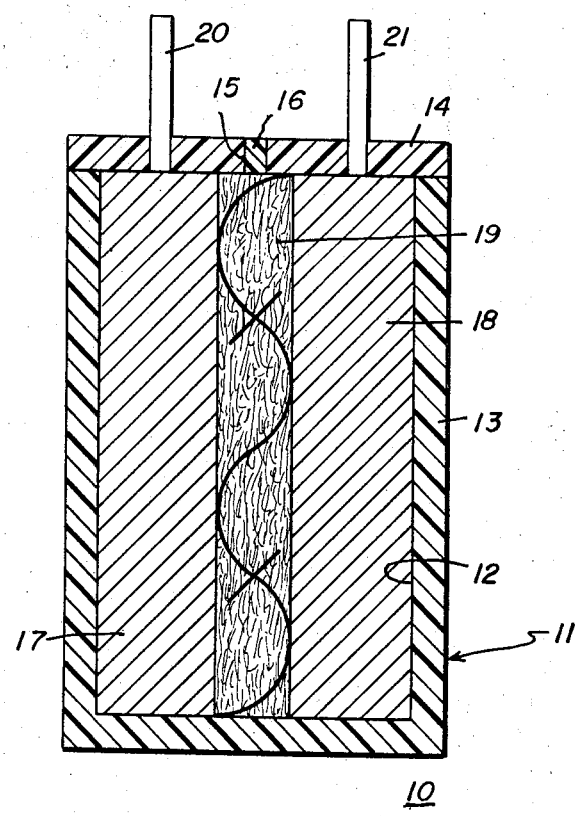
Inventors:
Randall N. King;
William N. Carson, Jr.,
by Paul R. Webb, II
Their Attorney.

COULOMETER WITH ELECTRODE CONTAINING EXCESS OF AT LEAST 200 PERCENT MERCURIC OXIDE

This invention relates to coulometers and, more particularly, to coulometers employing spaced mercury and mercuric oxide electrodes in an alkaline electrolyte.

Related copending Pat. application Ser. No. 801,516 filed Feb. 24, 1969, discloses and claims a coulometer including active materials on one of the electrode substrates of metallic cadmium in an amount equivalent to the predetermined coulometric capacity of the coulometer, and cadmium hydroxide in an mount of at least 100 percent of the metallic cadmium, and active material on the second electrode substrate of cadmium hydroxide in an amount equivalent to the amount of the metallic cadmium and cadmium hydroxide on the first electrode substrate.

Related copending Pat. application Ser. No. 821, 362, filed concurrently herewith discloses and claims a coulometer including active materials on one of the electrode substrates of metallic cadmium in an amount equivalent to the predetermined coulometric capacity of the coulometer, and cadmium hydroxide in an amount of at least 1 200 percent of the metallic cadmium, and the active material on the second electrode substrate of mercuric oxide in an amount equivalent to the amount of the metallic cadmium and cadmium hydroxide on the first electrode substrate. Both of the copending application are assigned to the same assignee as the present application.

A coulomter is a device which measures accurately the quantity of electricity which flows through a circuit. In a silver coulometer, the charge to be measured flows through the equivalent of small silver-plating bath in series in the circuit, and the mass of silver dissolved or deposited is accurately determined. For example, a pair of silver electrodes are immersed in a solution of silver nitrate. The charge that flows in the circuit is readily computed since 1 Faraday (96,522 coulombs) deposits 1 equivalent (107.91 grams) of silver.

In U.S. Pat. No. 3,302,091 issued Jan. 31, 1967, there is described a coulometric device or coulometer in which an electrochemical cell contains two sintered nickel plaque supports impregnated with cadmium and cadmium hydroxide, respectively, which are spaced apart in an alkaline electrolyte, such as potassium hydroxide, contained within the cell. Initially, the active material on both plaques is cadmium oxide of hydroxide. Current is passed through the cell in such a direction to reduce all of the material on one plaque to metallic cadmium and to evolve gaseous oxygen from the other electrode which gas escapes through a cell vent.

This patent sets forth that the reduction of the cadmium hydroxide on one plaque to metallic cadmium results in some oxidation of other nickel plaque support containing nickel hydroxide. This plaque oxide is removed by short-circuiting the cell or reversing the current in the cell until the voltage becomes zero. This latter step thereby results in one electrode with substantially all of its at active material of cadmium hydroxide and the other electrode in the form of metallic cadmium with 5 to 10 percent in the form of cadmium hydroxide.

Subsequently, during operation at constant current, an electronic circuit controlled by the voltage across the device is suggested to enable the bypassing of some, or when necessary, virtually all of the available current at the end of its cycle to prevent electrode damage. The coulometer of the this patent is indicated to be particularly useful in the charging of secondary batteries.

The present invention is directed to an improved coulometer of the above type with greater stability which eliminates electrode support damage by oxidation during initial and subsequent charging by containing a substantial excess of mercuric oxide in each of its electrodes.

It is a primary object of our invention to provide an improved coulometer which provides an electron exchange or charge transfer between an ion and an inert electrode upon current passage thereby eliminating the problems of deposition and dissolution of material and gas evolution.

It is a further object of our invention to provide an improved coulometer which operates as a very accurate, reproducible timing device.

In accordance with one aspect of our invention, a coulometer comprises a closed container defining a chamber, an alkaline electrolyte in the chamber, a pair of spaced apart, reversible electrodes positioned in the container and in contact with the electrolyte, and electrically conductive lead in contact with each of the electrodes, and each of the electrodes consisting of an inert support and active material contained thereon. The active materials of one of the electrodes is metallic mercury in an amount equivalent to the predetermined coulometric capacity of the coulometer, and mercuric oxide in an amount of amount of at least 200 percent of the metallic mercury, and the active material of the other electrode is mercuric oxide in an amount equivalent to the amount of the metallic mercury and mercuric oxide of the first electrode.

These and various other objects, features and advantages of the invention will be better understood from the following description taken in connection with the accompanying drawing in which a coulometer embodying our invention is shown in section in side elevation.

In the single FIGURE of the drawing, there is shown generally at 10 a coulometer embodying our invention. The coulometer comprises a container or vessel 11 defining a chamber 12. The container 11 is preferably made of a nonconductive material such as poly(methyl methacrylate) or other plastic material. Casing 11 has a body portion 13 and a top portion 14 sealed thereon. A vent 15 is shown sealed by a vent plug 16. A pair of reversible electrodes 17 and 18 are positioned within chamber 12 of container 11 and spaced apart by a chemically inert separator 19 of a material, such as unwoven Nylon. An alkaline electrolyte (not shown) is contained in separator 19 whereby both electrodes 17 and 18 are in contact with the electrolyte. A suitable electrolyte is 31 percent potassium hydroxide. A pair of electrical leads 20 and 21 are connected to electrodes 17 and 18, respectively. Each of the electrodes consists of an inert support and active material contained on the support. One of the electrodes has active materials of metallic mercury in an amount equivalent to the predetermined coulometric capacity of the coulometer, and mercuric oxide in an amount of at least 200 percent of the metallic mercury, while the other electrode has active material of mercuric oxide in an amount equivalent to the amounts of the metallic mercury and mercuric oxide of the first electrode.

We discovered unexpectedly that we could form a stable coulometer by employing a large excess of mercuric oxide in both of its electrodes. We found that such a coulometer can be formed by a closed container defining a chamber, an alkaline electrolyte in the chamber, a pair of spaced apart, reversible electrodes positioned in the container and in contact with the electrolyte, an electrically conductive lead in contact with each of the electrodes, each of the electrodes consisting of an inert support and active material contained thereon, the active materials of one of the electrodes being metallic mercury in an amount equivalent to the predetermined coulometric capacity of the coulometer, and mercuric oxide in an amount of at least 200 percent of the metallic mercury, and the active material of the second electrode being mercuric oxide in an amount equivalent to the amount of the metallic mercury and mercuric oxide of the first electrode.

We found that the employment of the excess amount of mercuric oxide in both electrodes provided an improved cell wherein the predetermined coulometric capacity required initial and subsequent conversion of a small amount of the available capacity. The improved cell can be easily charged initially without oxidation damage to the electrode support. During subsequent operation, similar oxidation damage is avoided. The addition of the excess amount of mercuric oxide did not result in a disadvantage in cell operation.

The electrode support can be in a variety of materials and configurations. We prefer to employ a fine nickel mesh onto which is applied a mixture of red mercuric oxide powder, natural graphite, and polyethylene impregnated graphite by pressing at 30,000 pounds per square inch at room temperature. We found that a preferred ratio of these materials is 5:3:2. One of the electrodes is then prereduced to provide metallic mercury equivalent to the desired capacity of the cell.

In an illustrative operation of the above-described cell shown in the single FIGURE of the drawing, the cell was assembled as described above and shown in the single FIGURE The active material of both of the electrodes was mercuric oxide in an amount 3 to 10 times larger than the required capacity of the cell.

The mercury-mercuric oxide electrodes were prepared for the cell by mixing red mercuric oxide powder, natural graphite, and polyethylene impregnated graphite in a small ball mill. These materials were mixed together in a ratio of 5:3:2. This material was pressed onto a pair of fine nickel mesh screens at a pressure of 30,000 pounds per square inch at room temperature.

The electrodes were then assembled in a cell as shown in the single FIGURE of the drawing and an alkaline electrolyte of 31 percent potassium hydroxide was added. One of the electrodes was then prereduced by using a nickel mesh counterelectrode for 30 minutes at 20 milliamperes. The counterelectrode, which was initially inserted also in the cell, was then removed. The top portion was then sealed thereon. A vent plug was then employed to seal the vent opening. A substantial amount of air was left in the electrode at the time it was sealed. After the above prereduction, one of the electrodes had active materials of metallic mercury and a large excess of mercuric oxide, while the other electrode had active material of mercuric oxide.

Subsequently, the cell was operated for a number of cycles of charging and discharging of the electrodes of the cell at a constant current. This cycling was done so that the cell was charged in the forward direction until its potential reached 0.3 volt. The current was then reversed until the potential reached $-0.3$ volt. A new cycle was then begun. During the operation of the cell, mercury was discharged at one electrode as shown in Equation 1, while mercury is charged at the other electrode as shown in Equation 11.

(I) $Hg + 2OH^- \longrightarrow HgO + H_2O + 2e$
(II) $HgO + H_2O + 2e \longrightarrow Hg + 2OH^-$ During the discharge of the mercury at one of the electrodes, the voltage across the coulometer was approximately zero as long as free mercury is left to discharge. Upon exhaustion of the mercury, cell voltage rises sharply showing completion of the reaction. The cell operation is then reversed whereupon it follows the above reactions of Equations 1 and 11 until completion of the exhaustion of the mercury.

Examples of coulometers made in accordance with our invention are set forth below:

EXAMPLE 1

A coulometer was assembled generally as shown in the single FIGURE of the drawing. Each of eight electrodes was made of a substrate comprising a fine nickel mesh screen onto which was pressed a one gram portion of a mixture composed of 5 parts by weight of red mercuric oxide powder, 3 parts of natural graphite, and 2 parts of polyethylene impregnated graphite. Prior to pressing the material on the substrate, the above components were mixed in a small ball mill. Each of the nickel mesh screens had a diameter of 1 1/16 inch. The mixture was pressed onto the screen in a 1⅛ inch diameter die at a pressure of 30,000 pounds per square inch at room temperature.

Two of these electrodes were then inserted into a plastic body portion of a cell container with a separation therebetween of about ⅛ inch. Thirty-one percent potassium hydroxide solution was added as the electrolyte to cover the electrodes. A nickel mesh counterelectrode was then inserted in the container after which one of the electrodes and the counterelectrode were connected electrically for 30 minutes at a current of 20 milliamperes to prereduce the electrode. The counterelectrode was then removed from the body portion and the top portion of the container was sealed to the body portion. A vent plug closed the vent in the top portion. A substantial amount of air was left in the container upon sealing the top portion to the body portion.

This cell was cycled at a constant current of 10 milliamperes for a period of 120 minutes per cycle for 48 hours. The cell was charged in the forward direction until its potential reached 0.3 volt. The current was then reversed until the potential reached $-0.3$ volt, completing the cycle.

EXAMPLE 2

A coulometer was assembled as described above and as shown in the single FIGURE of the drawing. Two of the electrodes from Example 1 were employed.

This cell was cycled at a constant current of 1 milliampere for a period of 1,200 minutes per cycle for 21 days. The cell was charged in the forward direction until its potential reached 0.3 volt. The current was then reversed until the potential reached $-0.3$ volt.

EXAMPLE 3

A coulometer was assembled and operated as described above and as shown in the single FIGURE of the drawing. Two of the electrodes from Example 1 were employed.

This cell was cycled at a constant current of 0.5 milliampere for a period of 2,400 minutes per cycle for 350 days. The cell was charged in the forward direction until its potential reached 0.3 volt. The current was then reversed until the potential reached $-0.3$ volt.

EXAMPLE 4

A coulometer was assembled an operated as described above and as shown in the single FIGURE of the drawing. Two of the electrodes from Example 1 were employed.

This cell was cycled at a constant current of 0.5 milliampere for a period of 800 minutes per cycle for 300 days. The cell was charged in the forward direction until its potential reached 0.3 volt. The current was then reversed until the potential reached $-0.3$ volt.

While other modifications of the invention and variations thereof which may be employed within the scope of the invention have not bee been described, the invention is intended to include such as may be embraced within the following claims:

We claim:

1. A coulometer comprising a closed container defining a chamber, an alkaline electrolyte in the chamber, a pair of spaced apart, reversible electrodes positioned in the container and in contact with the electrolyte each of the electrodes consisting of a inert support to the electrolyte and active material contained thereon, the active materials of one of the electrodes being metallic mercury wherein the amount thereof corresponds to the coulometric capacity of the coulometer, and said one electrode comprising mercuric oxide in an amount of at least 200 percent of the metallic mercury, and the active material of the second electrode being mercuric oxide in an amount equivalent to the amount of the metallic mercury and mercuric oxide of the first electrode.

2. In a coulometer as in claim 1, in which a chemically inert separator is positioned in the container between the electrodes.

UNITED STATES PATENT OFFICE
CERTIFICATE OF CORRECTION

Patent No. 3,564,350      Dated February 16, 1971

Inventor(s) Randall N. King and William N. Carson, Jr.

It is certified that error appears in the above-identified patent and that said Letters Patent are hereby corrected as shown below:

Claim 1, line 4, after "electrolyte" insert --,--

Claim 1, line 5, delete "inert support" and substitute therefor --support inert--

Signed and sealed this 22nd day of June 1971.

(SEAL)
Attest:

EDWARD M. FLETCHER, JR.      WILLIAM E. SCHUYLER, JR.
Attesting Officer      Commissioner of Patents